(12) United States Patent
Groeller et al.

(10) Patent No.: US 8,052,192 B2
(45) Date of Patent: Nov. 8, 2011

(54) ELECTRONIC DEVICE MOUNTING BOX

(75) Inventors: Charles J. Groeller, Orefield, PA (US);
Wayne Harwood, Allentown, PA (US)

(73) Assignee: Mack Trucks, Inc., Greensboro, NC (US)

( * ) Notice: Subject to any disclaimer, the term of this patent is extended or adjusted under 35 U.S.C. 154(b) by 246 days.

(21) Appl. No.: 12/516,946

(22) PCT Filed: Dec. 5, 2006

(86) PCT No.: PCT/US2006/046192
§ 371 (c)(1),
(2), (4) Date: May 29, 2009

(87) PCT Pub. No.: WO2008/069779
PCT Pub. Date: Jun. 12, 2008

(65) Prior Publication Data
US 2010/0026150 A1    Feb. 4, 2010

(51) Int. Cl.
*B60R 7/04* (2006.01)
(52) U.S. Cl. ..................................... 296/37.8
(58) Field of Classification Search .............. 296/37.8, 296/72; 312/223.1; 248/309.1; 29/469; 411/427
See application file for complete search history.

(56) References Cited

U.S. PATENT DOCUMENTS

| | | | |
|---|---|---|---|
| 4,024,737 A | 5/1977 | McInturff | |
| 4,103,983 A | 8/1978 | Morrison et al. | |
| 5,779,197 A * | 7/1998 | Kim | 248/27.1 |
| 6,957,839 B1 * | 10/2005 | Tiesler et al. | 296/24.34 |
| 7,165,798 B2 * | 1/2007 | Chamberlain et al. | 296/37.1 |
| 7,530,617 B2 * | 5/2009 | Kirner | 296/37.12 |
| 7,648,184 B2 * | 1/2010 | Boggess et al. | 296/1.03 |
| 2003/0160134 A1 * | 8/2003 | Upson et al. | 248/27.3 |
| 2005/0018392 A1 * | 1/2005 | Strohmeier et al. | 361/683 |
| 2005/0173938 A1 * | 8/2005 | Chamberlain | 296/37.1 |
| 2006/0145497 A1 * | 7/2006 | Stack et al. | 296/24.34 |
| 2008/0265607 A1 * | 10/2008 | Biggs et al. | 296/72 |
| 2010/0109363 A1 * | 5/2010 | Boggess et al. | 296/1.03 |
| 2010/0213730 A1 * | 8/2010 | Biggs et al. | 296/1.08 |
| 2010/0283281 A1 * | 11/2010 | Carnevali | 296/37.8 |

FOREIGN PATENT DOCUMENTS

WO    2006110142 A2    4/2005

OTHER PUBLICATIONS

International Search Report for corresponding International Application PCT/US2006/046192.

* cited by examiner

*Primary Examiner* — H Gutman
(74) *Attorney, Agent, or Firm* — WRB-IP LLP

(57) ABSTRACT

An electronic device mounting box includes a tray to which an electronic device is adapted to be attached. The mounting box includes a box having a front opening through which the tray is adapted to pass, left and right sides, and left and right supports associated with the left and right sides for supporting the tray along left and right sides, respectively, of the tray and permitting the tray to be moved between an access position at least partially outside the front opening to an installed position inside the box.

17 Claims, 4 Drawing Sheets

ELECTRONIC DEVICE MOUNTING BOX

BACKGROUND AND SUMMARY

The present invention relates to electronic device mounting boxes and, more particularly, to electronic device mounting boxes having a tray to which an electronic device is attached wherein the tray is movable relative to the box between an access position and an installed position, or removable.

The use of CB radios is very popular, particularly among truck drivers. In spite of this fact, in many trucks, drivers have to improvise to mount their CB radios in the truck, such as by securing them to dashboards or improved bracket arrangements. International Publication No. WO 2006/110142 is incorporated by reference and discloses a storage unit with an electronic device mounting structure that can be useful for mounting devices such as CB radios in trucks.

Generally, each driver has his or her own CB radio for his or her personal use. However, many trucks are used by different drivers, such as in the case of short-haul trucks where the same truck is used for several shifts during a day. Conventional techniques for mounting devices like CB radios are designed for substantially permanently mounting the CB radios. It is difficult for drivers to substitute one CB radio for another when drivers change.

It is desirable to provide an electronic device mounting box that facilitates removal and installation of electronic devices.

According to an aspect of the present invention, an electronic device mounting box comprises a tray to which an electronic device is adapted to be attached, and a box having a front opening through which the tray is adapted to pass, left and right sides, and left and right supports associated with the left and right sides for supporting the tray along left and right sides, respectively, of the tray and permitting the tray to be moved between an access position at least partially outside the front opening to an installed position inside the box, or removed.

According to another aspect of the present invention, a vehicle comprising the electronic device mounting box is provided.

BRIEF DESCRIPTION OF THE DRAWINGS

The invention is described in connection with a preferred embodiment shown in the following drawings in which.

DETAILED DESCRIPTION

Figure 1:
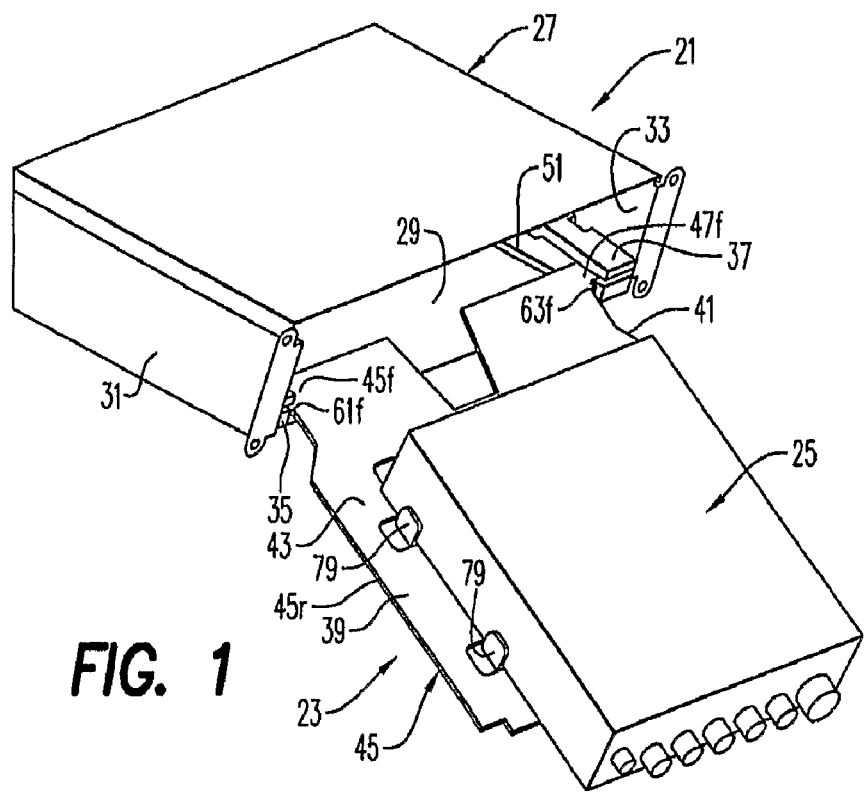
FIG. 1 is a left side, perspective view of an electronic device mounting box with a tray on which an electronic device is mounted in an access position according to an embodiment of the present invention.

An electronic device mounting box 21 according to an embodiment of the present invention is shown in FIGS. 1-4. The mounting box 21 comprises a tray 23 to which an electronic device 25 (FIGS. 1-3) such as a CB radio is adapted to be attached. The mounting box 21 further comprises a box 27 having a front opening 29 through which the tray 23 is adapted to pass, left and right sides 31 and 33, and left and right supports 35 and 37 associated with the left and right sides. The mounting box 21 is particularly useful for permitting easy installation and removal of CB radios from overhead consoles in motor vehicles such as trucks as is often necessary when multiple drivers operate the same truck at different times.

Figure 2:
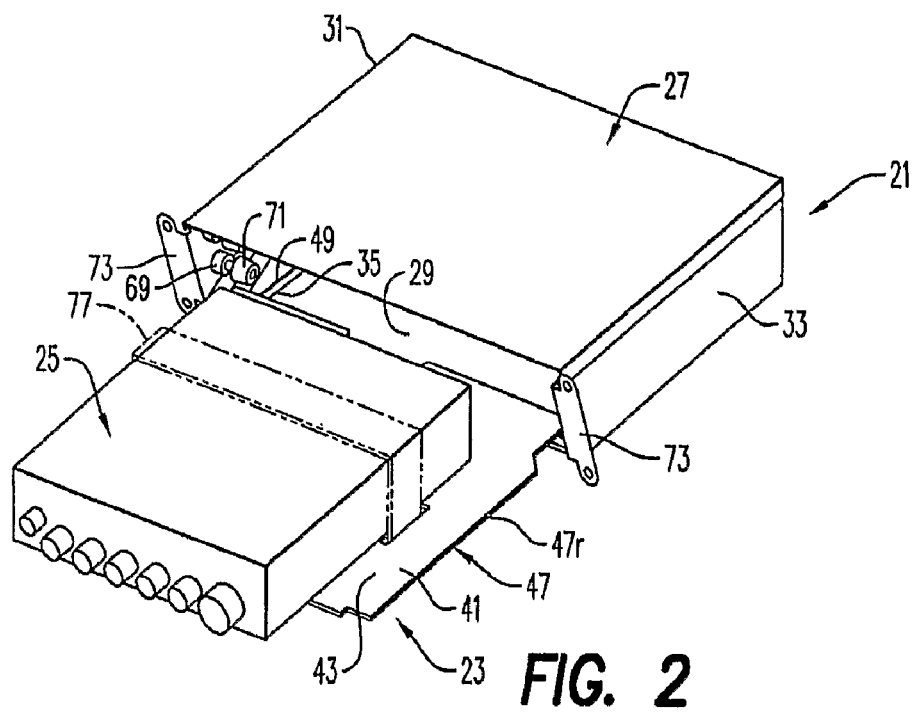
FIG. 2 is a right side, perspective view of an electronic device mounting box with a tray on which an electronic device is mounted in another access position according to an embodiment of the present invention.
Figure 3:
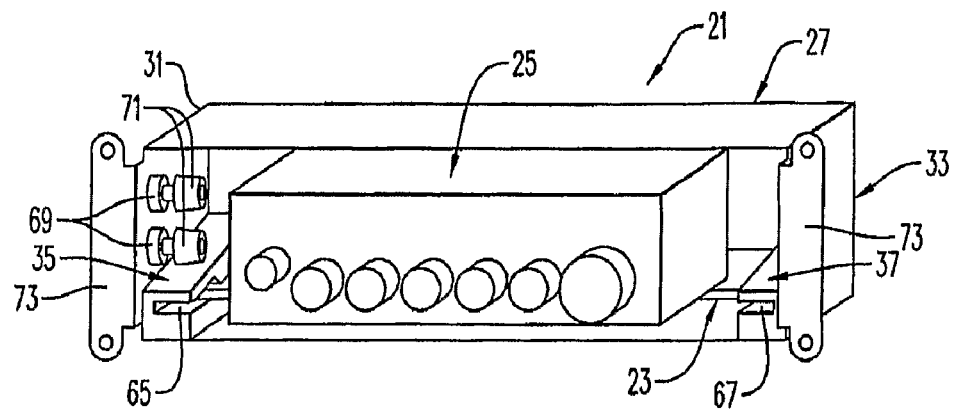
FIG. 3 is a frontal, perspective view of an electronic device mounting box with a tray on which an electronic device is mounted in an installed position according to an embodiment of the present invention.

The left and right supports 35 and 37 support the tray 23 along left and right sides 39 and 41, respectively, of the tray. The left and right supports 35 and 37 also permit the tray 23 to be moved between an access position (two of which are shown in FIGS. 1 and 2) in which the tray 23 is at least partially outside the front opening 29 to an installed position as shown in FIG. 3 in which the tray is entirely or substantially entirely inside the box 27. The left and right supports 35 and 37 can also permit the tray 23 to be moved entirely outside of the box 27, ordinarily from an access position such as is shown in FIG. 2.

Figure 4:
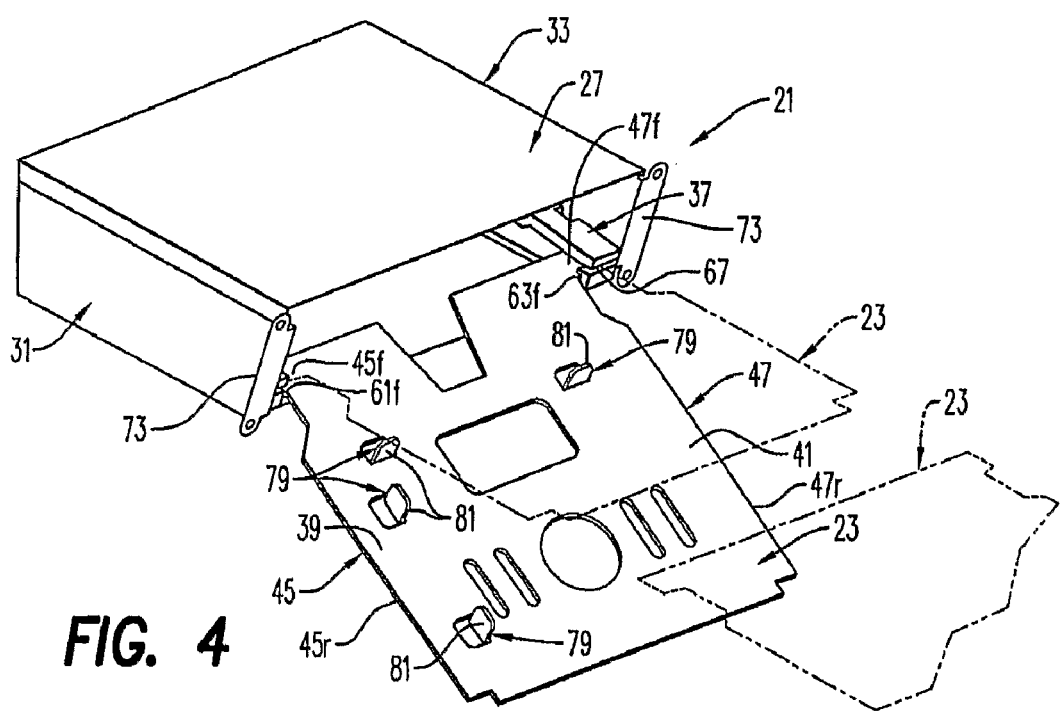
FIG. 4 is a left side perspective view of an electronic device mounting box with a tray without an electronic device mounted thereon in an access position according to an embodiment of the present invention.

As seen, for example, in FIG. 4, the tray 23 comprises a main body 43 and left and right tabs 45 and 47 extending from left and right sides 39 and 41 (FIGS. 1 and 2), respectively, of the main body. The left and right tabs 45 and 47 cooperate with the left and right supports 35 and 37 to support the tray 23 relative to the box 27.

Figure 5:
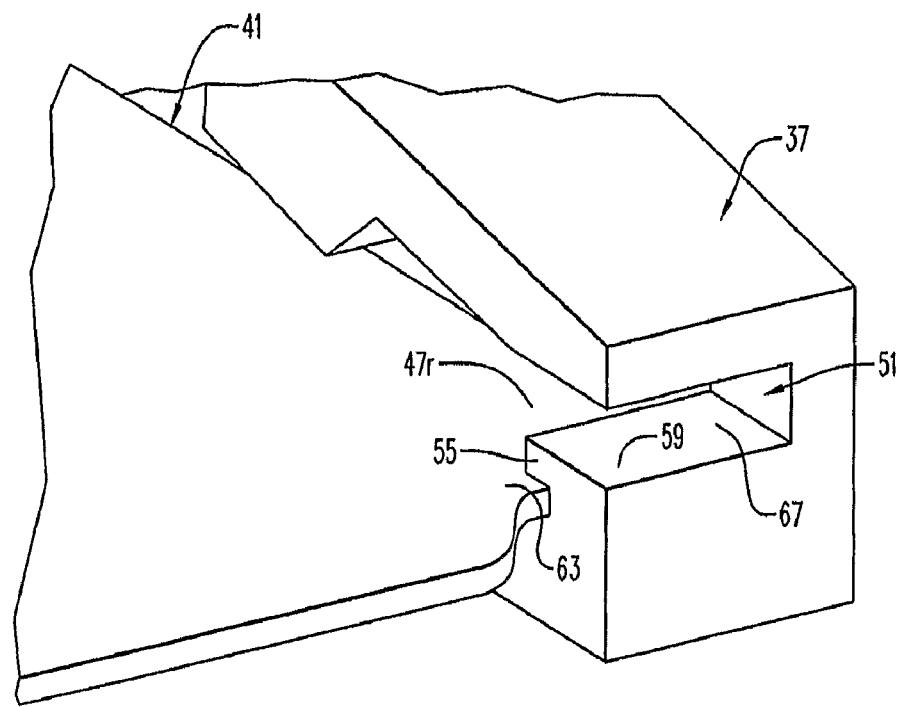
FIG. 5 is a perspective view of a portion of a retention arrangement for an electronic device mounting box according to an embodiment of the present invention showing a tray retained in an installed position.
Figure 6:
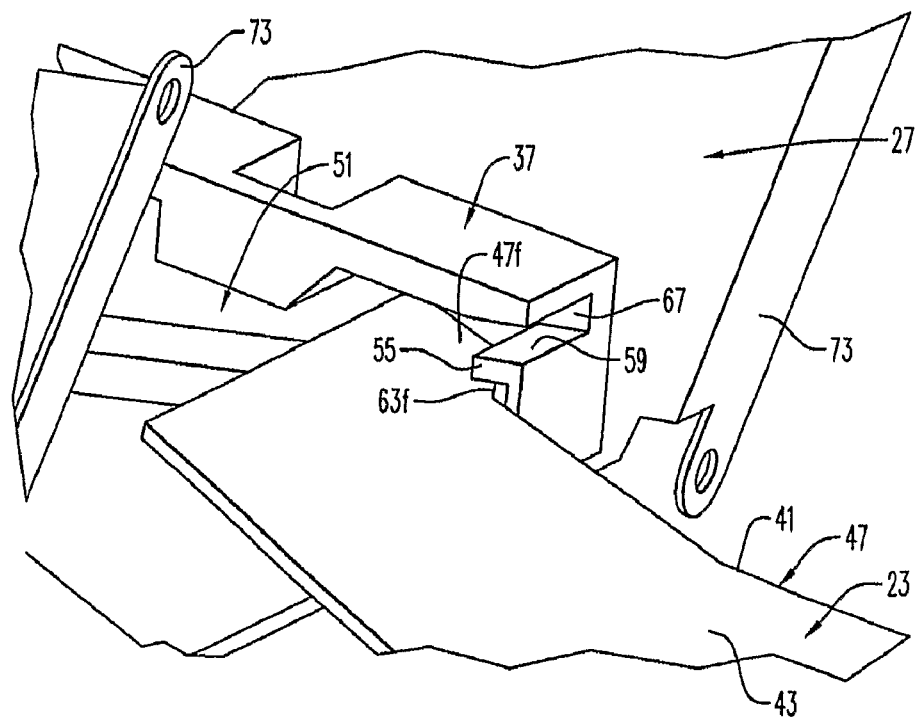
FIG. 6 is a perspective view of a portion of a retention arrangement for an electronic device mounting box according to an embodiment of the present invention showing a tray retained in an access position.
Figure 7:
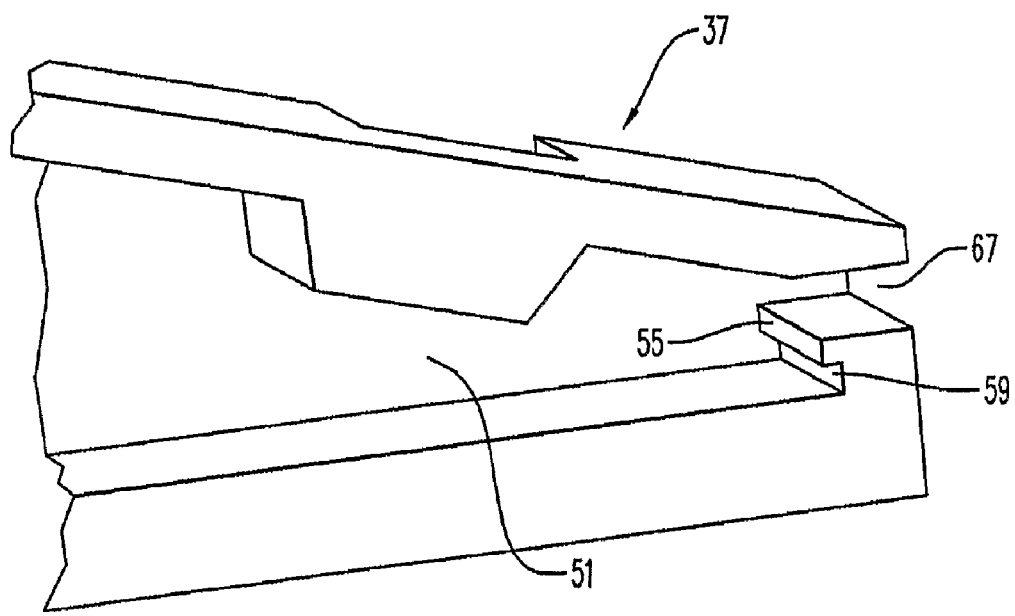
FIG. 7 is a perspective view of a portion of a retention arrangement for an electronic device mounting box according to an embodiment of the present invention.

The left and right supports 35 and 37 can include left and right grooves 49 and 51 (FIGS. 1 and 2, portion of right groove 51 shown enlarged in FIGS. 5-7), respectively, in which the left and right tabs 45 and 47, respectively, are adapted to be slidably received. The left and right grooves 49 and 51 can comprise left and right lips, respectively, at rear ends of the left and right grooves (right lip 55 shown at rear end 59 of right groove 51 in FIGS. 5-7 can be mirror image of left lip). An enlarged view of a right groove 51 is shown in FIGS. 5-7, and it will be understood that the left groove 49 can be a substantial mirror image of the right groove. The left and right lips are adapted to engage with rear ends of the left and right tabs 45 and 47 to retain the tray 23 in the installed position as seen in FIG. 3. FIG. 5 shows an embodiment of the right lip 55 retaining the rear end 63 of the right tab 47. It will be appreciated that the left lip can retain the rear end of the left tab 45 in substantially the same way. A portion of a groove 51 of a right support 37 including a right lip 55 is shown in FIG. 7 without the tray 23.

As seen in FIG. 4, the left and right tabs 45 and 47 can include forward and rear tabs 45$f$ and 45$r$ and 47$f$ and 47$r$. The left and right lips can be adapted to engage with rear ends of the forward left and right tabs 45$f$ and 47$f$ on the tray 23 to retain the tray in the access position. Engagement of the rear end 63 of the rear right tab 47$r$ of the tray 23 with the right lip 55 is shown in somewhat enlarged fashion in FIG. 5. Engagement of the rear end 63$f$ of the right tab 47$f$ of the tray 23 with the right lip 55 is shown in somewhat enlarged fashion in FIG. 6. As shown in phantom in FIG. 4, when the left and right tabs 45 and 47 are disengaged from the left and right lips, the tray 23 is adapted to be completely removed from the box by sliding the left and right tabs through rearward openings 65 and 67 in the left and right supports 35 and 37.

As seen in FIG. 2 (and in phantom in FIG. 4), when the left and right tabs 45 and 47 are disengaged from the left and right lips, the left and right grooves 49 and 51 of the left and right supports 35 and 37 may support the tray 23 by the forward left and right tabs 45f and 47f (seen in, e.g., FIG. 1) at the same or substantially the same angle relative to the box 27 that the left and right supports support the tray when the tray is in the installed position shown in FIG. 3 and both the forward and rear tabs 45f and 45r and 47f and 47r are in the left and right grooves.

When the left and right lips engage with rear ends of the forward left and right tabs 45f and 47f on the tray 23 to retain the tray 23 in the access position, the tray can be disposed at a different angle (seen in FIGS. 1, 4, and 6) relative to the box 27 than when the tray is in the installed position as shown in FIGS. 3 and 5. In the position shown in FIGS. 1, 4, and 6, a truck driver will generally have greater access to an electronic device such as a CB radio mounted on the tray 23 in an overhead console than when the tray is in the position shown in FIG. 2.

The box 27 will ordinarily include at least one opening 69 in the box for receiving ground, power, and antenna connections for the electronic device. As seen in FIGS. 2 and 3, five way binding posts or equal electrical termination points 71 to transition power and ground from the vehicle to the electronic component can extend through the opening(s) 69 to facilitate attachment of the electrical connections. Alternatively, or in addition, electrical wires can simply extend through an opening in the box 27.

As seen in, e.g., FIGS. 1-4, the box 27 can comprise at least one flange, ordinarily at least two flanges 73, for mounting the box to a wall, such as the wall of an overhead console in a vehicle such as a truck. As shown in phantom in FIG. 2, the tray 23 can comprise a mounting arrangement 77 such as a strap for releasably securing the electronic device 25 to the tray. As seen in FIG. 4, the tray 23 can alternatively, or additionally, include bendable tabs 79 that can be bent to contact and/or retain the electronic device 25 on the tray. The tray 23 may include VELCRO fasteners 81, such as VELCRO fasteners on bent tabs 79, for mating with corresponding VELCRO fasteners on the electronic device 25 to facilitate supporting the electronic device relative to the tray.

In the present application, the use of terms such as "including" is open-ended and is intended to have the same meaning as terms such as "comprising" and not preclude the presence of other structure, material, or acts. Similarly, though the use of terms such as "can" or "may" is intended to be open-ended and to reflect that structure, material, or acts are not necessary, the failure to use such terms is not intended to reflect that structure, material, or acts are essential. To the extent that structure, material, or acts are presently considered to be essential, they are identified as such.

The invention must not be regarded as being limited to the exemplary embodiments described above, a number of further variants and modifications being feasible without departing from the scope of the following claims.

What is claimed is:

1. An electronic device mounting box, comprising:
a tray to which an electronic device is adapted to be attached; and
a box having a front opening through which the tray is adapted to pass, left and right sides, and left and right supports associated with the left and right sides for supporting the tray along left and right sides, respectively, of the tray and permitting the tray to be moved between an access position at least partially outside the front opening to an installed position inside the box,
wherein the tray comprises a main body and left and right tabs extending from left and right sides, respectively, of the main body, the left and right tabs cooperate with the left and right supports to support the tray relative to the box, the left and right supports include left and right grooves, respectively, in which the left and right tabs, respectively, are adapted to be slidably received, and the left and right grooves comprise left and right lips, respectively, at rear ends of the left and right grooves, the left and right lips being adapted to engage with rear ends of the left and right tabs to retain the tray in at least one of the installed position and the access position, and, when the left and right tabs are disengaged from the left and right lips, the tray is adapted to be completely removed from the box.

2. The electronic device mounting box as set forth in claim 1, wherein the supports comprise a retainer for retaining the tray in the installed position.

3. The electronic device mounting box as set forth in claim 2, wherein the retainer retains the tray in the access position.

4. The electronic device mounting box as set forth in claim 3, wherein, when the tray is in the access position, the tray is disposed at a different angle relative to the box than when the tray is in the installed position.

5. The electronic device mounting box as set forth in claim 4, wherein the tray is adapted to be disposed in a plurality of positions relative to the box.

6. The electronic device mounting box as set forth in claim 1, wherein the retainer retains the tray in the access position.

7. The electronic device mounting box as set forth in claim 6, wherein, when the tray is in the access position, the tray is disposed at a different angle relative to the box than when the tray is in the installed position.

8. The electronic device mounting box as set forth in claim 1, wherein the left and right lips are adapted to engage with rear ends of the left and right tabs to retain the tray in the installed position.

9. The electronic device mounting box as set forth in claim 8, wherein the left and right tabs include forward tabs and the rear tabs, and wherein the left and right lips are adapted to engage with rear ends of the forward left and right tabs on the tray to retain the tray in the access position.

10. The electronic device mounting box as set forth in claim 1, wherein the left and right lips are adapted to engage with the rear ends of the left and right tabs to retain the tray in the access position.

11. The electronic device mounting box as set forth in claim 1, comprising at least one opening in the box for receiving ground, power, and antenna connections for the electronic device.

12. The electronic device mounting box as set forth in claim 1, wherein the box comprises at least one flange for mounting the box.

13. The electronic device mounting box as set forth in claim 1, wherein the tray comprises a strap for releaseably securing the electronic device to the tray.

14. The electronic device mounting box as set forth in claim 1, wherein the tray comprises a flange extending substantially perpendicularly to a supporting surface of the tray, the flange comprising a fastener for fastening the electronic device relative to the tray.

15. The electronic device mounting box as set forth in claim 14, wherein the fastener comprises a hook and loop fastener for mating with a corresponding hook and loop fastener on the electronic device.

16. The electronic device mounting box as set forth in claim 1, wherein the electronic device is a citizens band radio.

17. A vehicle comprising the electronic device mounting box as set forth in claim 1.

* * * * *